United States Patent [19]

Hehl

[11] 4,235,575

[45] Nov. 25, 1980

[54] DEVICE FOR LUBRICATING THE TIE RODS OF AN INJECTION MOLDING MACHINE

[76] Inventor: Karl Hehl, Arthur-Hihl Strasse 32, 7298 Lossburg 1, Fed. Rep. of Germany

[21] Appl. No.: 41,346

[22] Filed: May 22, 1979

[30] Foreign Application Priority Data

May 22, 1978 [DE] Fed. Rep. of Germany ....... 2822248

[51] Int. Cl.[2] .............................................. B29C 1/00

[52] U.S. Cl. .......................... 425/107; 425/DIG. 115

[58] Field of Search ............... 425/107, DIG. 115, 78, 425/450.1

[56] References Cited

U.S. PATENT DOCUMENTS

| | | | |
|---|---|---|---|
| 3,392,688 | 7/1968 | Korsch | 425/107 |
| 3,676,030 | 7/1972 | Roepenock et al. | 425/78 |
| 3,822,975 | 7/1974 | Hehl | 425/107 |
| 3,841,823 | 10/1974 | Hehl | 425/107 X |
| 4,094,621 | 6/1978 | Hehl | 425/450.1 X |
| 4,147,490 | 4/1979 | Stewart | 425/107 |

*Primary Examiner*—J. Howard Flint, Jr.
*Attorney, Agent, or Firm*—Joseph A. Geiger

[57] ABSTRACT

A device for lubricating the tie rods in the die closing unit of an injection molding machine, consisting of a tubular shell which forms an annular chamber around the tie rod and a lubricant absorbing fleece body occupying said chamber, the shell being constituted by two identical half shells which are joined along longitudinal edges provided with matching flexible tongue-and-groove formations, for the forcible radial snap assembly between shell-straddling wall portions of the guided part of the die closing unit.

16 Claims, 5 Drawing Figures

30
39
29
31
37
36
40
16a
16
16c
II
16b
15
34
35
32
11
20
14

Fig. 3
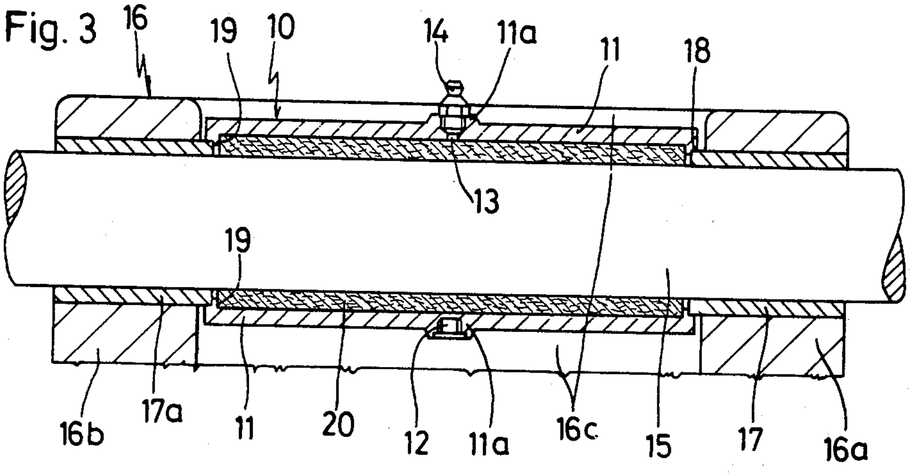
Fig. 4
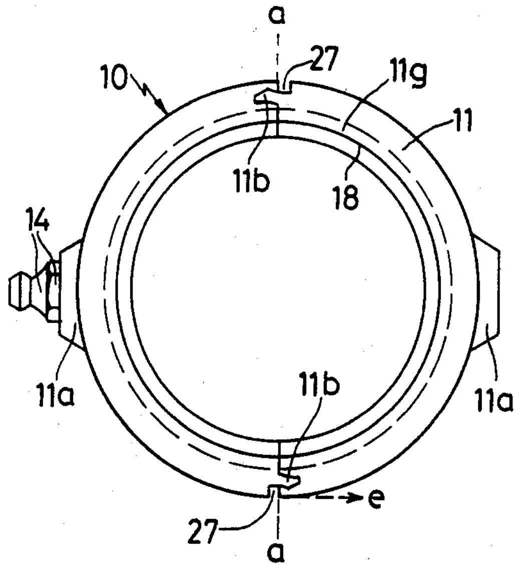
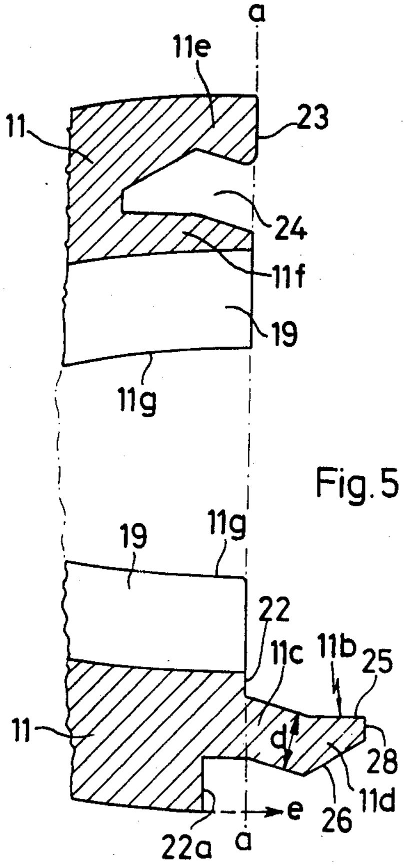
Fig. 5

DEVICE FOR LUBRICATING THE TIE RODS OF AN INJECTION MOLDING MACHINE

BACKGROUND OF THE INVENTION

1. Field of the Invention

The present invention relates to injection molding machines, and, more particularly, to the die closing unit of an injection molding machine and to a device for lubricating the tie rods of such a die closing unit.

2. Description of the Prior Art

The prior art in the field of injection molding machines encompasses a number of different machine types, with an assortment of different die closing units. These die closing units, with few exceptions, have in common that they use two or four parallel tie rods to provide the guidance for the movable die half and its supporting structure during the die closing and opening movements. The accuracy and rigidity of this guidance is of great importance, both for a consistant quality of the machine output and for the longevity of the die closing unit. An important factor in maintaining this accuracy and longevity is a reliable supply of lubricant for the tie rods and the cooperating slide bushings.

It is well known to arrange for a supply of lubricant to a reciprocating guide assembly by having an annular lubricant holding chamber arranged inside a sleeve, between axially spaced guide bushings. Such an arrangement is shown, for example, in U.S. Pat. No. 4,094,621 which discloses a die closing unit for an injection molding machine featuring a heavy movable die carrier frame which is guided for opening and closing movements on four tie rods. The die carrier frame, consisting of axially spaced transverse walls which are connected by four hollow guide sockets and reinforcing ribs, has short guide bushings arranged in both ends of each guide socket. The intermediate length portions of the guide sockets thus form chambers which, when periodically filled with lubricant, provide a good lubricant supply.

Another tie rod lubrication system is disclosed in U.S. Pat. No. 3,833,204, where two tie rods which carry an injection unit are lubricated with hydraulic fluid. Tubular piston rods, surrounding a length portion of the two tie rods, form annular lubricant holding chambers into which lubricant is continuously fed from the pressure spaces of the associated injection cylinders, via helical lubricating grooves arranged in the tubular piston rods.

The first-mentioned lubrication system has the shortcoming of being limited to a grease lubricant, with its disadvantage of not freely flowing to the place where it is consumed. It therefore requires frequent refills under pressure. The second prior art solution is limited to tie rods which support a tubular piston rod, or tie rods which double as piston rods, where a hydraulic pressure space providing a ready supply of hydraulic fluid is available.

SUMMARY OF THE INVENTION

Underlying the present invention is the objective of providing a lubricating device for the tie rods of an injection molding machine which, while providing a reliable supply of lubricant, requires only minimal changes in the structure of the die closing unit and, accordingly, is very inexpensive.

The present invention proposes to attain this objective by suggesting a lubricating device for the tie rods of an injection molding machine which features a tubular shell which, together with the tie rod itself, forms an annular lubricant holding chamber, with a lubricant absorbing body, preferably a fleece body, occupying this annular chamber.

In a preferred embodiment of the invention, the tubular shell consists of two identical injection molded half shells of plastic material with cooperating longitudinal tongue-and-groove profiles which make it possible for the half shells to be snapped together, around the tie rod and surrounding fleece body.

The invention further suggests that this lubricating shell be arranged between two axially spaced guide bushings of a movable part of the die closing unit, whereby the bushings also provide convenient centering shoulders for the two half shells. However, instead of axially confining the lubricating shell of the invention between spaced guide bushings, it is also possible to axially couple the lubricating shell to the extremity of a guide bushing, by providing a clamping engagement, or appropriate cooperating radial protrusions and recesses, such as a groove-and-collar configuration, for example, on the extremities of the half shells and guide bushings. The radial snap-mounting capability of the lubricating shell allows for a variety of coupling configurations.

In a preferred embodiment, the invention further suggests that the cooperating tongue-and-groove profiles of each half shell extend over the full axial length of the shell and that the tongue profile is shaped to have a base portion of uniform thickness, but outwardly inclined, adjoining a radially inwardly inclined, tapered entry portion, while the matchingly shaped groove profile is flanked by radially flexing lip portions. In the mounted position, the two half shells form a closed longitudinal joint on the inside of the tongue-and-groove configuration, while leaving a longitudinal gap on the outside thereof, so that the half shells can be readily pried apart, if necessary.

BRIEF DESCRIPTION OF THE DRAWINGS

Further special features and advantages of the invention will become apparent from the description following below, when taken together with the accompanying drawing which illustrates, by way of example, a preferred embodiment of the invention which is represented in the various figures as follows:

FIG. 3 shows, at an enlarged scale and longitudinally cross-sectioned, a portion of the movable die carrier frame of the injection unit of FIG. 1 which includes a tie rod lubricating device embodying the present invention;

FIG. 4 shows the tie rod lubricating device of FIG. 3, still further enlarged, in an end view; and FIG. 5 shows further enlarged cross-sectional details of a half shell which forms part of the tie rod lubricating device of FIGS. 3 and 4.

DESCRIPTION OF THE PREFERRED EMBODIMENT

Figures 1, 2:
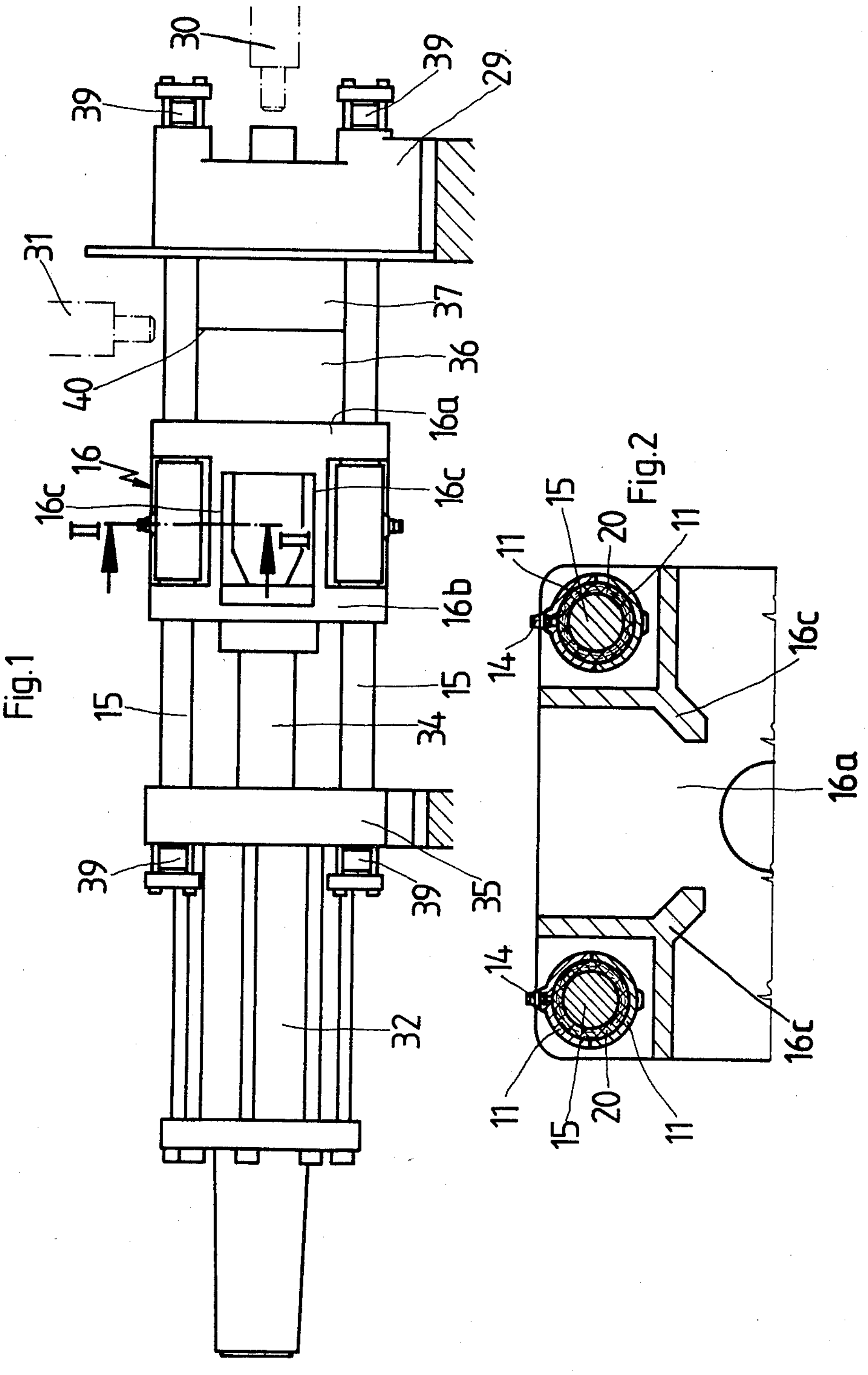
FIG. 1 shows in elevation, a push-type die closing unit for an injection molding machine, as a preferred application for the tie rod lubricating device of the present invention.
FIG. 2 shows a transverse cross section through the upper part of the die closing unit of FIG. 1, taken along line II—II of FIG. 1.

Referring to FIGS. 1 and 2 of the drawing, which give an overall view of a push-type die closing unit of an injection molding machine, it can be seen that the die closing unit is designed for die opening and closing movements along a horizontal movement axis. The guidance for these horizontal movements is provided by four horizontal tie rods 15 whose axes are identically spaced from the longitudinal center axis of the unit and coincide with the four corners of a square. The forward end portions of the four tie rods are seated in a transversely extending stationary die carrier plate 29, the opposite end portions of the tie rods being similarly seated in a transversely extending cylinder head plate 35. The threaded extremities of the tie rods 15 are held in place and axially preloaded against the plates 29 and 35 by means of clamping heads 39. The stationary plates 29 and 35 and the four tie rods extending between them thus form a rigid support structure.

The four tie rods 15 support and guide a movable die carrier frame 16. To the rear side of this frame is connected the piston rod 34 of a hydraulic drive cylinder 32 which extends rearwardly from the cylinder head plate 35, along the center axis of the die closing unit. On the piston rod 34 is seated a double-acting drive piston (not shown).

The movable die carrier frame 16 consists of a transversely extending die mounting wall **16*a* on its forward side and a likewise transversely extending pressure transfer wall 16*b* which is spaced axially rearwardly from wall 16*a* and rigidly connected thereto by means of four Y-shaped pressure transfer ribs 16*c*. As can be seen in FIG. 2, the four tie rods 15 are positioned between the leg portions of the Y-shaped pressure transfer ribs 16*c***, but separated from them by a gap.

The injection molding die itself is shown as consisting of two die halves 36 and 37 which meet at the die separation plane 40, the stationary die half 37 being mounted on the stationary die carrier plate 29, and the movable die half 36 being attached to the die mounting wall **16*a* of the movable die carrier frame 16. The die closing unit of FIG. 1 further shows the position of a horizontal injecting unit 30, in alignment with an axial sprue channel, and the position of a vertical injecting unit 31, in alignment with a radial sprue channel which coincides with the die separation plane 40. In the open center space of the movable die carrier frame 16** is further arranged a known hydraulic ejecting device.

The die opening and closing action of the hydraulic drive cylinder 32 and its piston rod 34 produces a horizontal reciprocating movement of the movable die carrier frame 16 on the four tie rods 15 from the closed position which is shown in FIG. 1 to an open position to the left thereof. During this reciprocating movement, the movable die carrier frame 16 is precisely guided on the four tie rods 15, engaging each rod with two guide bushings 17 and **17*a*, as shown in FIG. 3. There, it can also be seen that the guide bushings 17 and 17*a* are arranged in the two transverse walls 16*a* and 16*b*, respectively, of the die carrier frame 16**.

In the space between the guide bushings 17 and **17*a* of each guide rod 15 is arranged a tie rod lubricating device (FIG. 3) which consists essentially of a tubular shell 10 surrounding the tie rod 15 with a radial gap, and an absorbant lubricant supply body 20 occupying the annular chamber which is formed by the gap between the shell 10 and the tie rod 15. The absorbant lubricant supply body, preferably a fleece body, such as a felt sleeve, for example, stays in frictional engagement with the tie rod 15 during the reciprocating movements of the die carrier frame 16, thereby applying a thin film of lubricant to the surface of the tie rod 15**. The absorbancy of the lubricant supply body makes it possible to utilize lubricants of low viscosity, including lubricating oils, without wasting the latter through excessive initial application, after the lubricant supply has been replenished.

As can be seen in FIG. 3, the shell 10 occupies the entire axial space between the guide bushings 17 and **17*a*, engaging inwardly protruding end portions of the two guide bushings with centering collars 18 on the shell extremities. The centering collars 18 are part of radially inwardly reaching axial shoulder portions 19 on the extremities of the shell 10 which thereby also serve to axially contain and position the fleece or felt sleeve 20. This means that the tie rod lubricating device is not only concentrically centered around the tie rod 15, but also axially confined between the guide bushings 17 and 17*a* of the movable die carrier frame 16**, giving it a firm position.

As can be seen in FIGS. 4 and 5, the tubular shell 10 of the invention consists of two identical half shells 11 which are attached to one another by means of a tongue-and-groove configuration. This attachment takes place in a simple snap action. For this purpose, each half shell 11 has on one longitudinal edge a longitudinal tongue formation **11*b* and on the opposite edge a longitudinal groove formation 24. The tongue 11*b* of one half shell engages the groove 24 of the other half shell. In the assembled condition, the two half shells 11 form a longitudinal joint along an axial center plane a—a, whereby the flanks 22 and 23** on the longitudinal edges abut against one another to form a leak-tight enclosure.

The tongue-and-groove configuration of the half shells 11 features, as part of the shape of the connecting tongue **11*b*, a base portion 11*c* of uniform thickness d which is inclined at an angle of approximately 10° against a tangent plane e to the periphery of the shell 10, at the point where it intersects the plane a—a at right angles. This outwardly inclined base portion 11*c* adjoins a tapered entry profile 11*d*, consisting of an end face 28 which is substantially parallel to plane a—a, an inner face 25 which is substantially perpendicular to plane a—a, and an outer face 26 which is inclined opposite to the inclination of the base portion 11*c*, at an angle of approximately 30° to the tangent plane e. This somewhat kinked shape of the connecting tongue 11*b* is matched by a similar shape of the connecting groove 24, so that, during the snap-action entry of the tongue 11*b* into the groove 24, the lip portions 11*e* and 11*f* on the inner and outer sides of the groove 24 are forcibly spread apart in the radial sense, until the "hump" of the tongue 11*b* snaps into the matchingly shaped recess of the groove 24**.

In order to facilitate the separation of the two half shells 11 from each other, they further feature two longitudinal tool gaps 27 adjacent to the plane a—a of their longitudinal joint. The gaps 27 are formed by flank portions **22*a* on the outer side of the half shell edges which carry the tongue formations 11*b*, the flank portions 22*a* being recessed peripherally, away from the edge flank 23** of the opposite edges. The latter coincide with plane a—a.

Each half shell is further provided with a centrally located eye protrusion **11*a* with a radially oriented threaded bore 12 which stops short of the inner wall of the half shell, leaving a thin wall, so that the threaded bore 12 of one half shell can remain open to the outside, while a suitable refill nipple 14 is screwed into the threaded bore 12 of the other half shell, where the thin wall at the bottom of the bore has been broken out, or drilled through, to form a bore 13**. For lubricating devices which have a comparatively long shell, it may be advisable to provide two axially spaced refill nipples.

It can thus be seen that the two half shells are identical injection molded parts which, because they require no machining operations, are very inexpensive. In addition, they are extremely easy to assemble and to take apart, if necessary. In order to improve the durability of the half shells, especially of their tongue-and-groove formations, it is suggested that the plastic material used in the injection molding process be a high-polymer, glass-fiber reinforced compound.

It has been found that a single replenishment of the lubricant supply body with lubricant will give satisfactory lubricating service over hundreds of hours of operation. If, after a period of extended service, it becomes necessary to remove and clean the felt sleeve 20, this can be done by simply prying apart the half shells with a tool, or a pair of tools, that simultaneously engage both longitudinal gaps 27. Following washing or replacement of the felt sleeve 20, the half shells 11 are then simply snapped back together, under radial pressure, whereupon the device is replenished with lubricant.

It should be understood that the lubricating device of the invention, while shown and described as being axially confined between two guide bushings, is not limited in its applications to this convenient case alone. Obviously, it is also possible to arrange such a guide rod lubricating device ahead or behind any rod guide assembly, provided the shell of the lubricating device is held in place adjacent to the guide bushing or guide bore, as the case may be. A guide bushing is preferable, because it offers a simple way of connecting the shell of the lubricating device to the extremity of the bushing, by using cooperating connecting formations on the bushing and shell. The radial assembly of the two half shells allows for a wide variety of suitable connecting configurations. For instance, the guide bushing may have a shallow annular groove near its extremity, or it may have a localized depression, or a radial bore. In each case, the half shells would have matching radial protrusions in the form of either a radial collar, or a localized radial protrusion, or a pin-like protrusion, to match the bore, respectively. The opposite extremity of the tubular shell would preferably have a shoulder portion which centers and guides the shell on the guide rod itself.

While the present invention has been described as applied to the die closing unit of an injection molding machine, it should be quite obvious that its usefulness is not limited to this kind of application, but that the device can be used for a variety of other applications, where one member of a straight-line guide assembly is a guide rod and the other member embraces that guide rod. It should therefore be understood that the foregoing disclosure describes only a preferred embodiment of the invention and that it is intended to cover all changes and modifications of this example of the invention which fall within the scope of the appended claims.

I claim the following:

1. A device for lubricating a straight-line guide assembly of which one member is a guide rod and another member embraces the guide rod so as to provide a longitudinal guiding action, as one member executes a reciprocating motion relative to the other, the lubricating device comprising in combination:

a tubular shell enveloping a length portion of the guide rod with a radial gap so as to form an annular chamber therewith, the tubular shell being assembled from a plurality of longitudinally parted shell sectors which are insertable over and removable from the guide rod in a radial direction;

a lubricant supply body occupying the annular chamber formed by the tubular shell, said supply body being absorbant and holding a quantity of lubricant while frictionally engaging the surface of the guide rod, thereby transferring lubricant to the latter during the reciprocating motion; and means for axially restraining the tubular shell in relation to the rod-embracing member of the guide assembly, so as to force the shell and the lubricant supply body to execute the same relative axial movements as the rod-embracing member.

2. A lubricating device as defined in claim 1, wherein the lubricant supply body is a felt sleeve; and the device further comprises means for axially retaining the felt sleeve inside the shell, against the forces created by its frictional engagement with the guide rod.

3. A lubricating device as defined in claim 1, wherein the shell is composed of two half shells which are joined along two diametrically oppositely located longitudinal edges; and the longitudinal edges of the two half shells define between them flexible catch means permitting a forcible snap action connection of one half shell against the other as well as a forcible separation therefrom.

4. A lubrication device as defined in claim 3, wherein the two half shells are identical, interchangeable parts, being injection molded of plastic material.

5. A lubrication device as defined in claim 3 or claim 4, wherein the flexible catch means on the longitudinal edges of the half shells include a tongue formation on two edges and a matching groove formation on the other two edges, the tongue-and-groove formations being so oriented that they permit the simultaneous snap action insertion of the two tongues into the two grooves, in a radial approach movement of the two half shells.

6. A lubrication device as defined in claim 5, wherein the tongue formations and groove formations on the edges of the half shells extend over substantially the entire axial length of the half shells.

7. A lubrication device as defined in claim 5, wherein the tubular shell further includes, in the area of at least one edge joint of the two half shells, a tool gap for the engagement therewith of a prying tool which is capable of applying a separating force to the two half shells.

8. A lubrication device as defined in claim 7, wherein the edge joints between the two pairs of cooperating edges of the half shells coincide with an axial plane through the longitudinal axis of the tubular shell; and the tubular shell has two tool gaps, each in the form of a longitudinal groove which is formed in part by one edge having a flank coinciding with the plane of the edge joint and in part by the cooperating edge having a flank which is peripherally recessed away from the plane of the edge joint.

9. A lubrication device as defined in claim 5, wherein the tongue formation has a cross-sectional profile formed by a base portion of uniform thickness which is inclined outwardly by an angle of approximately 10 degrees in relation to a tangent plane on the periphery of the tubular shell, at the associated edge joint, and by an outer portion in the form of a tapered entry profile which adjoins the base portion.

10. A lubrication device as defined in claim 9, wherein the entry profile of the tongue formation defines an outer face which is inclined inwardly by an angle of approximately 30° in relation to said tangent plane, and an inner face which is substantially parallel to said tangent plane; and the base portion and the entry profile of the tongue formation form obtuse angles at their inner and outer junction points of approximately 170 degrees and 140 degrees, respectively, said junction points being substantially aligned in the radial sense.

11. A lubrication device as defined in claim 3 or claim 4, wherein at least one of the half shells has in its wall a radially oriented threaded bore and a refill nipple screwed into said bore, for the replenishment of the lubricant supply body with fresh lubricant.

12. A lubrication device as defined in claim 3 or claim 4, wherein the rod-embracing member of the guide assembly engages the guide rod on two axially spaced length portions with guide walls which axially straddle the tubular shell; and the axial restraining means of the tubular shell includes abutment surfaces on the two guide walls which engage the shell from opposite axial sides.

13. A lubrication device as defined in claim 12, wherein the rod-embracing member has guide bushings in its two guide walls, each guide bushing having an exposed end portion defining one of said abutment surfaces; and the tubular shell has flange portions on both axial extremities engaging said abutment surfaces of the guide bushings in the axial sense and also engaging the exposed end portions of the guide bushings in the radial sense, thereby centering the tubular shell in relation thereto.

14. A lubrication device as defined in claim 13, wherein the flange portions of the tubular shell extend radially inwardly toward the surface of the guide rod, thereby also serving to axially retain the lubricant supply body inside the shell, against the forces created by its frictional engagement with the guide rod.

15. A lubrication device as defined in claim 1, wherein the rod-embracing member of the guide assembly includes a guide bushing with an exposed end portion;

the axial restraining means of the tubular shell includes cooperating connecting formations in the bushing end portion and in the shell, taking the form of a depression in one, and a matching radially engageable protrusion in the other.

16. In the die closing unit of an injection molding machine, the combination comprising:

a plurality of parallel tie rods defining a longitudinal main axis therebetween;

a stationary die carrier plate extending transversely to the main axis and rigidly connected to the forward extremities of the tie rods;

a stationary head plate likewise extending transversely to the main axis and rigidly connected to the rear extremities of the tie rods, the head plate forming the forward extremity of an axially oriented double-acting drive cylinder whose piston rod reaches forward, through the head plate;

a movable die carrier frame attached to the forward end of the piston rod, so as to be movable therewith toward and away from the stationary die carrier plate, in a die closing and opening movement, the movable die carrier frame having on its forward side a transversely extending die mounting wall, and on its rearward side a transversely extending pressure transfer wall, including pressure transfer members extending axially between said walls;

guide bushings in both walls of the movable die carrier frame engaging each tie rod on axially spaced length portions thereof; and a lubricant dispensing tie rod lubricating device arranged on each tie rod, in the space between the guide bushings of the movable die carrier frame, the tie rod lubricating device comprising:

a tubular shell which is positioned by said guide bushings and which envelops the guide rod with a radial gap so as to form an annular chamber therewith, the shell being assembled from two half shells which are joined along diametrically oppositely located longitudinal edges by means of cooperating flexible tongue-and-groove formations on said edges; and an absorbant lubricant supply body arranged in the annular chamber formed by the tubular shell.

* * * * *